(12) United States Patent
Turek et al.

(10) Patent No.: US 6,754,376 B1
(45) Date of Patent: Jun. 22, 2004

(54) METHOD FOR AUTOMATIC SEGMENTATION OF MEDICAL IMAGES

(75) Inventors: Matthew William Turek, Glenville, NY (US); Jerome Francois Knoplioch, Neuilly sur Seine (FR); Alexis Vapillon, Paris (FR)

(73) Assignee: General Electric Company, Niskayuna, NY (US)

( * ) Notice: Subject to any disclaimer, the term of this patent is extended or adjusted under 35 U.S.C. 154(b) by 520 days.

(21) Appl. No.: 09/721,195

(22) Filed: Nov. 22, 2000

(51) Int. Cl.⁷ .................................................. G06K 9/00
(52) U.S. Cl. ....................................................... 382/131
(58) Field of Search ................................. 382/128, 131, 382/132, 270; 378/4, 19, 21, 22, 23, 26; 250/363.04; 600/425; 348/77, 162, 163

(56) References Cited

U.S. PATENT DOCUMENTS

| 5,150,427 | A | * | 9/1992 | Frazee et al. ............... 382/131 |
| 5,166,876 | A | * | 11/1992 | Cline et al. ................. 345/424 |
| 5,671,265 | A | * | 9/1997 | Andress .................... 378/98.11 |
| 5,832,134 | A | | 11/1998 | Avinash et al. ............. 382/257 |
| 5,898,793 | A | * | 4/1999 | Karron et al. .............. 382/131 |
| 5,903,664 | A | | 5/1999 | Hartley et al. ............. 382/154 |
| 6,148,095 | A | * | 11/2000 | Prause et al. ............... 382/131 |
| 6,175,655 | B1 | * | 1/2001 | George, III et al. ........ 382/257 |
| 6,360,116 | B1 | * | 3/2002 | Jackson, Jr. et al. ........ 600/427 |
| 6,385,332 | B1 | * | 5/2002 | Zahalka et al. ............. 382/128 |
| 6,501,848 | B1 | * | 12/2002 | Carroll et al. .............. 382/128 |
| 2002/0193687 | A1 | * | 12/2002 | Vining et al. ............... 600/425 |

* cited by examiner

Primary Examiner—Andrew W. Johns
Assistant Examiner—Shervin Nakhjavar
(74) Attorney, Agent, or Firm—Jean K. Testa; Patrick K. Patnode

(57) ABSTRACT

An method for automatically extracting a three-dimensional sub-structure, for example a coronary vessel tree, from a plurality of slice images comprises the steps of depositing a seed point within a selected region of interest and segmenting the plurality of slice images responsive to the deposition of the seed point. The segmentation is performed in accordance with a plurality of predetermined classification values to extract the three-dimensional sub-structure. A method for automatically segmenting comprises the steps of receiving a deposited seed point, extracting a plurality of desired regions within the sub-structure and generating a segmented sub-structure from the extracted desired regions.

10 Claims, 6 Drawing Sheets

METHOD FOR AUTOMATIC SEGMENTATION OF MEDICAL IMAGES

BACKGROUND OF THE INVENTION

The present invention relates to image processing and more specifically to segmenting three-dimensional (3D) structures from a series of cardiac images.

Computed tomography (CT) scans provide a non-invasive method for imaging the human body. One particular area of interest is imaging the heart and the vessels contained in the heart. Doctors are especially interested in examining the coronary arteries because they provide the doctor with a measure of the patient's cardiac health.

Medical images of a subject's heart typically are comprised of several slices throughout the 3D volume of the heart. In addition, the heart may be imaged at several different instants or phases in the cardiac cycle. Thus the ensemble of all images gives a picture of the heart during the complete course of one heart beat.

It is often desirable to use the set of images to extract quantitative information about the heart motion useful in medical diagnosis. Such information includes measurement of the cardiac blood volume, the ejection fraction and the amount of wall motion. It is necessary to detect and differentiate contiguous anatomical regions of the heart to perform this measurement. Identification of contiguous regions of the same material is known as segmentation.

Doctors can use existing techniques for examining the data provided by a cardiac CT scan, including standard two and three-dimensional viewing techniques. However, if they wish to examine the three-dimensional vessel tree of the heart separately from the heart muscle and surrounding tissues, few good options exist. Tools exist that allow doctors to extract parts of the vessels from the surrounding tissues, but they either do not extract the whole vessel tree or they require significant user interaction. Often doctors must tediously segment the vessel tree by hand from either axial CT images or a 3D rendering of the image data. This may take several hours and requires the physician to manually define what is part of the vessel tree. What is needed is an automated technique for segmenting and displaying just the coronary vessel tree, which requires reduced operator interaction.

BRIEF SUMMARY OF THE INVENTION

A method for automatically extracting a three-dimensional sub-structure, for example a coronary vessel tree, from a plurality of slice images comprises the steps of depositing a seed point within a selected region of interest and segmenting the plurality of slice images responsive to the deposition of the seed point. The segmentation is performed in accordance with a plurality of predetermined classification values to extract the three-dimensional sub-structure.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
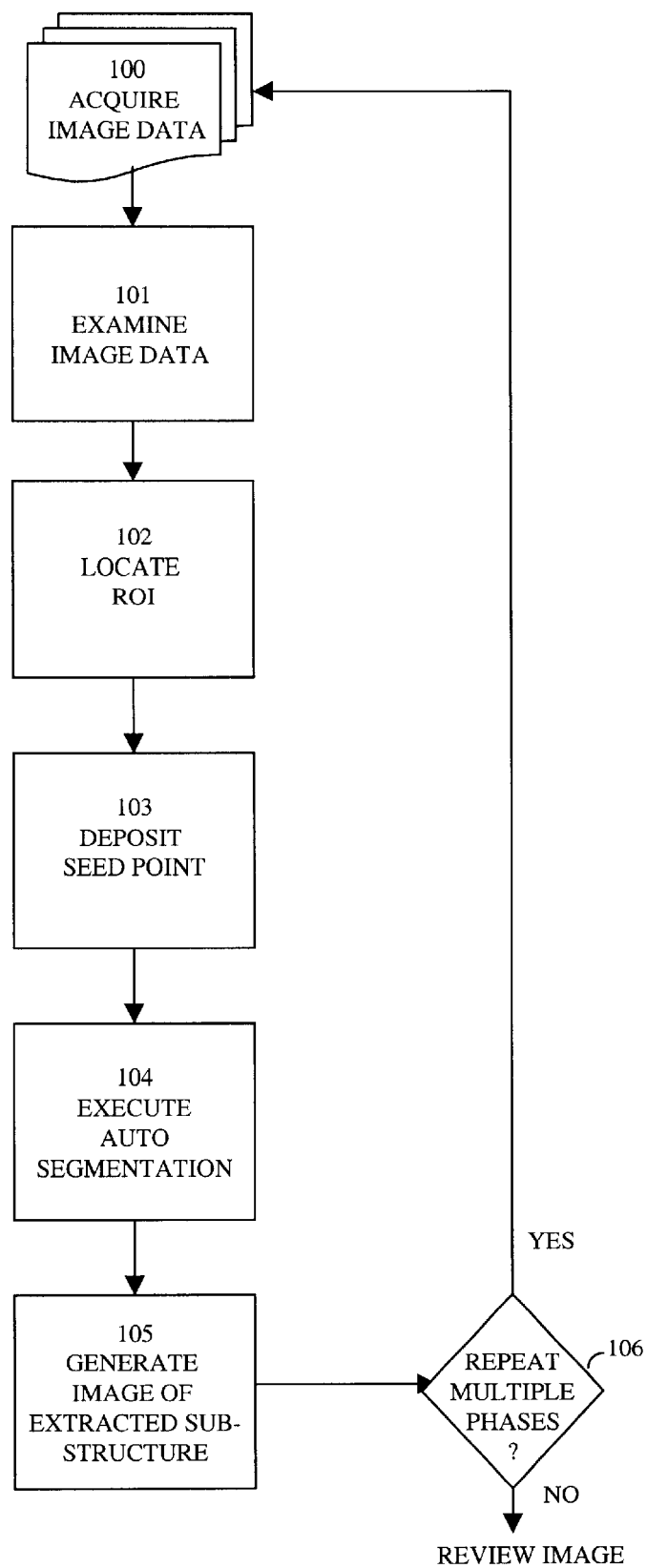
FIG. 1 is a block diagram showing an automatic extraction method to which preferred embodiments of the present invention are applicable.

Referring to FIG. 1, there is shown a block diagram of an embodiment of a method for automatically extracting a three-dimensional coronary sub-structure from a plurality of cardiac slice images. The user interaction proceeds as shown in FIG. 1. At 100, an axial set of images is acquired, for example by computed tomography (CT) scanning, in a well-known manner. In the description that follows, a set of axial CT images is used as the image data. However, it is to be appreciated that image data from Magnetic Resonance Imaging (MRI) is also suitable as image data for the automatic extraction method of the present invention. Typically, the desired coronary sub-structure is the coronary vessel tree that comprises the ascending aorta and the left and right coronary arteries. However, it is to be appreciated that the extraction method is suitable for other sub-structures within the heart, or alternatively within other dynamic organs within the body.

The user (for example, a physician or technician) is presented with axial CT images from a cardiac scan at 101. At 102, the user examines the image data to locate a region of interest (ROI). In this embodiment, the region of interest is the ascending aorta. The user moves through the images slice by slice, until the ascending aorta is seen. At 103, the user selects a region of interest (ROI), for example the ascending aorta, by depositing a seed point. Deposition of a seed point is performed using a user interaction device, such as a computer mouse. Once the seed point is deposited, the user initiates the execution of the automatic segmentation process, which will be described with reference to FIG. 2. Automatic, as used herewith, refers to a machine or computer-produced sequence of events versus requiring operator interaction. The seed point serves as the starting point for the data segmentation. The vessel segmentation process is responsive to the single deposited seed point, as set forth below in greater detail.

The vessel segmentation process automatically evaluates the image data in accordance with predetermined classification values to extract desired portions of the data to keep for the vessel visualization and to discard portions not desired. These classification values include pixel intensity or CT number of the pixels, pixel location relative to the seed point, the size of similar pixel groupings, and pixel connectivity in both two and three dimensions.

Referring further to FIG. 1, after execution of the automatic segmentation process, an image of the extracted region of interest is generated at 105. The modified data is displayed using any of the standard visualization techniques well known in the art, such as volume rendering or surface rendering. Desirably volume rendering is used to present a 3D volumetric image to the user, however, one skilled in the art would recognize that many other visualization techniques are possible.

In an alternative embodiment, if multiple volumes of image data are available for different phases of the heart cycle, the segmentation process is desirably applied multiple times to produce iterative segmentations of the vessel tree at different phases of the heart, as shown in 106 of FIG. 1. Thereafter, results of these iterative segmentations are suitable for animated display over time. In a further alternative embodiment, the automatically extracted coronary substructure is displayed and cross-referenced with axial and reformatted images.

Figure 2:
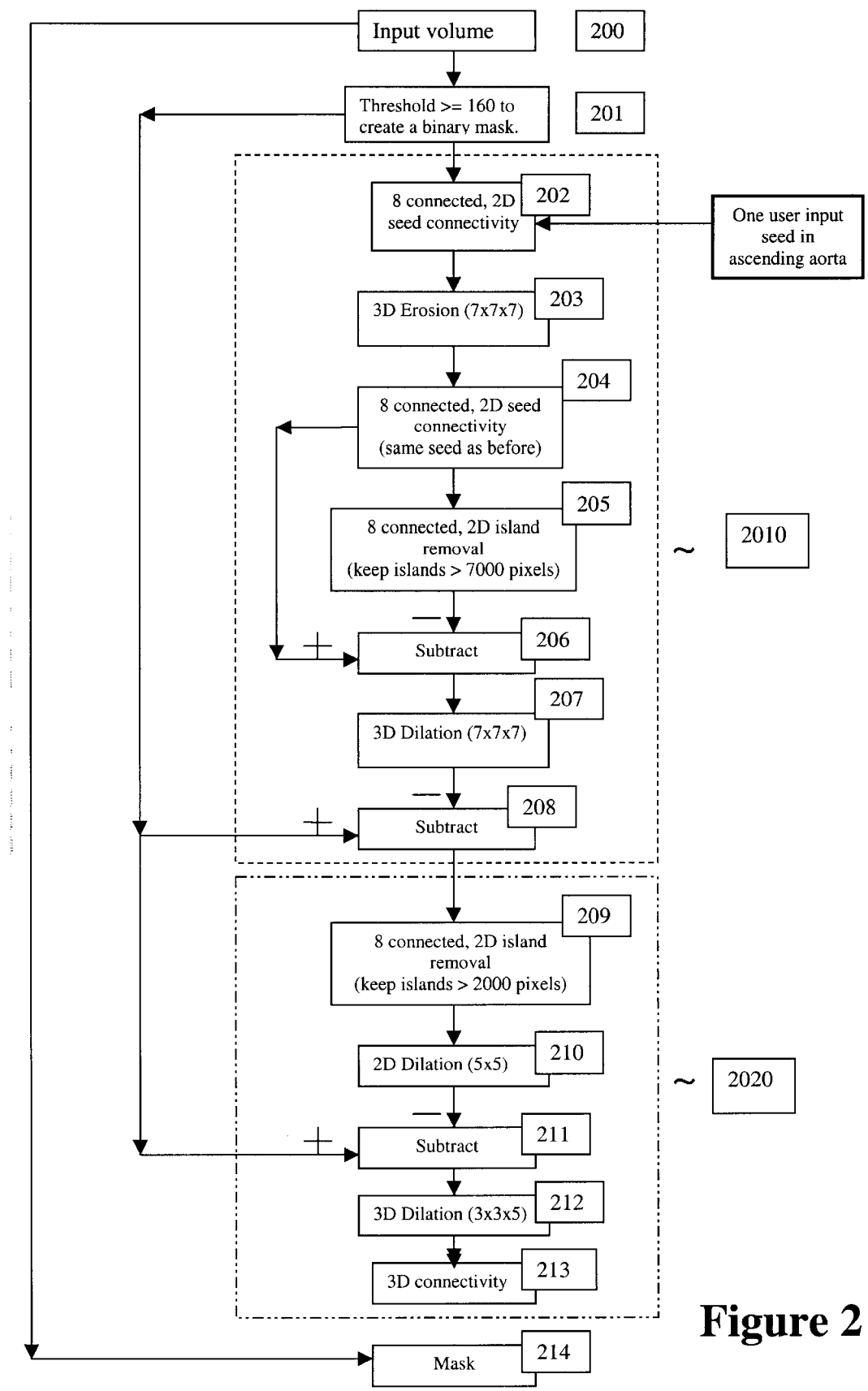
FIG. 2 is a flow diagram showing an automatic segmentation method useful in the method shown in FIG. 1.

Referring to FIG. 2, there is shown a more detailed flow diagram of an embodiment of an automatic segmentation method useful in the automatic extraction method of FIG. 1. In an embodiment, the vessel segmentation process comprises a two-part extraction process. The first part, shown as 2010 in FIG. 2, extracts the ascending aorta from the data. The ascending aorta is a large vessel that carries blood from the left ventricle to the body. The left and right coronary arteries branch from the ascending aorta. It is of particular interest to doctors to see the attachment points of the main coronary arteries to the ascending aorta because this area can not be easily examined with current imaging modalities. The ascending aorta will be kept as part of the final output.

The second part of the vessel segmentation process, shown as 2020 in FIG. 2, extracts the left and right coronary arteries from the data volume. The results of the two main parts of the process, the ascending aorta and the main coronary arteries, are presented to the user in the final output. The two-part process (2010 and 2020) facilitates an efficient isolation of the ascending aorta and then the coronary arteries based on respective predetermined classification values, thereby removing undesired portions of the heart that are not needed for diagnosis. The predetermined classification values, such as pixel intensity, pixel size and connectivity, which will discussed more fully with reference to FIG. 2.

Figure 3:
FIG. 3 is an illustration of an interim image resulting from steps in the automatic method of FIG. 2.

Referring further to FIG. 2, the automatic segmentation process is responsive to an input volume of data at 200. As with the process of FIG. 1, the input volume is an axial set of images from CT or MRI imaging operations. At 201, the input volume data is evaluated against a threshold in a known manner to produce a binary mask of pixels that are in the value range of interest, and those that are outside that range. In this embodiment, the classification value or threshold is a measure of pixel intensity often referred to as CT number and measured in Hounsfield units. Through experimentation and other known manners, a threshold is defined to indicate pixel intensity typical for an ascending aorta. As a result of thresholding at 201, pixels are turned "on" if they are part of a certain range of CT numbers and are turned "off" if they are not a part of the range of CT numbers. The binary mask resulting from applying a threshold to the input CT values is the input to the two parts of the segmentation process described earlier. FIG. 3 shows a representative interim image after thresholding, showing multiple coronary sub-structures which are turned "on" after thresholding. As is shown, the multiple coronary sub-structures include more than the coronary vessels (which cannot be clearly seen) and the ascending aorta 302. Also shown is seed point 300. Further extraction, which will be set forth below in greater detail, will result in extraction of only the desired substructures.

The vessel segmentation process now extracts the ascending aorta. After the threshold is applied to the original CT data, a seed connectivity process at 202 in FIG. 2, is run using the seed point indicated by the user. The seed connectivity searches the binary pixel mask output from the thresholding step. All the "on" pixels that are connected to the seed point specified by the user are kept and pixels that are either "off" or are not connected to the seed point are discarded. Connectivity in this case is defined as any pixels in the same axial image, which touch each other, either at a corner or along an edge. This is known in the art as eight-connectedness. The output of this step contains the ascending aorta plus some additional areas that need to be discarded. These areas will be refined in the additional processing steps that follow.

After running the two-dimensional seed connectivity, a 7×7×7, 3D erosion, labeled 203 in FIG. 2, is applied to the output of the connectivity. The 7×7×7 erosion is a technique, well known in the art, which removes outer layers of a structure. In this case, the 7×7×7 erosion breaks bridges that connect the ascending aorta to other structures that are not of interest. The output of this step is another binary mask.

The eight connected seed connectivity processing, labeled 204 in FIG. 2, is now applied to the output of the 7×7×7 erosion. This technique executes in the same manner as before, however, the output results are now more refined because connected structures that are not of interest have been eliminated.

The next step in the extraction of the ascending aorta is the removal of large islands from the results of the prior step, labeled 205 and 206 in FIG. 2. An island removal technique is applied that labels "islands" or groups of pixels in the axial images that are smaller than a certain size. Size is used as a classification value to include or exclude structures. In this embodiment, desirably the size is set at 7000 pixels. Once the islands that are smaller than 7000 pixels are labeled, all the other pixels are removed. This has the effect of keeping every grouping of pixels in an axial image that is smaller than 7000 pixels. Areas larger than 7000 pixels, for instance the chambers of the heart, are removed from the binary pixel mask.

After removing the large islands from the binary mask, the remaining pixels are expanded using 7×7×7 dilation, a technique well known in the art, labeled 207 in FIG. 2. The 7×7×7 dilation adds layers to a structure. This has the effect of restoring the size of structures that are left in the binary mask to their original size. The output of this step is a binary mask that defines the ascending aorta. "On" pixels are part of the ascending aorta and "off" pixels are not.

The output of the dilation is subtracted from the output of the original thresholding. This is step 208 in FIG. 2. The pixels that are "on" in both the outputs of the previous dilation and the original thresholding are turned "off". The other pixels are unchanged. The processing thus far has effectively isolated and extracted the ascending aorta for further processing.

The extraction of the main coronary arteries begins at 209. The classification values used to extract the main coronary arteries are mainly size and connectivity. Another eight connected, two-dimensional island removal is performed on the output of the prior step (208 of FIG. 2). The size threshold for this step is different from the previous island removal (205) and is selected to mark objects that are too big to be coronary vessels. In this step, this size threshold is set to 2000 pixels. The output of this step is similar to the output from the prior step; however, every cluster of pixels that is less than 2000 pixels in size has been removed.

After the island removal step, a two dimensional dilation is performed with a 5×5 kernel on the output of the island removal as in step 210 of FIG. 2. This step effectively overestimates the size of these objects which are bigger than 2000 pixels, by the selection of the kernel.

The results of the dilation are then subtracted at step 211 from the output of the original thresholding at step 201. This step removes the objects from the original thresholding that are too large to be vessels.

A dilation at step 212 is applied to the results of the subtraction step 211. The dilation strengthens the connectivity of pixels along the axis of the body The axis along the body correspond to the direction of the vessels within the body. Large portions of the coronary arteries run in this direction. In this embodiment, a non-symmetric, 3×3×5 dilation kernel is used.

Next a three-dimensional connectivity process, step 213 of FIG. 2, is applied to the results of the previous step. The same seed point specified by the user is now used to extract all the pixels that are connected to the seed. Connected in this case is defined as pixels that share an edge, a face, or a corner. As is well known in the art, this is called 26-connected. The output of this step defines the pixels that will be kept as part of the desired coronary sub-structure, the coronary vessel tree.

Figure 4:
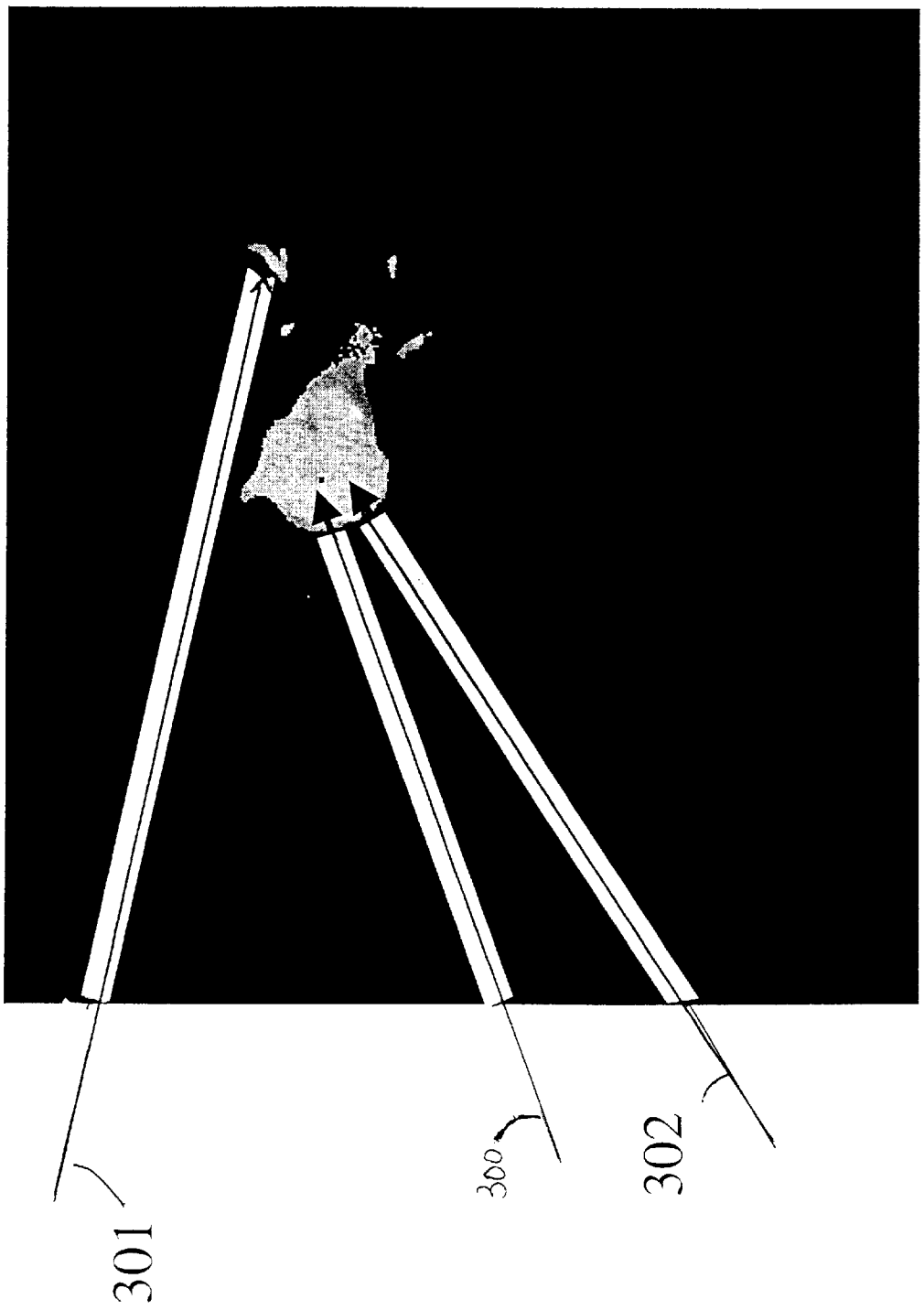
FIG. 4 an illustration of an image resulting from steps in the automatic method of FIG. 2.

Finally, a masking operation, step 214 of FIG. 2, is performed on the original data. The output of the three dimensional connectivity is one input to this step and the original data is the other input. The masking at 214 effectively converts the extracted pixels from 2010 and 2020 to the respective original CT values. If a pixel is "off" in the output of the previous step, it is set to zero in the original data. Otherwise, the pixels in the original data are left alone. FIG. 4 shows a representative resultant image of masking 214, showing the extracted ascending aorta 302 and coronary vessels 301.

Figure 5:
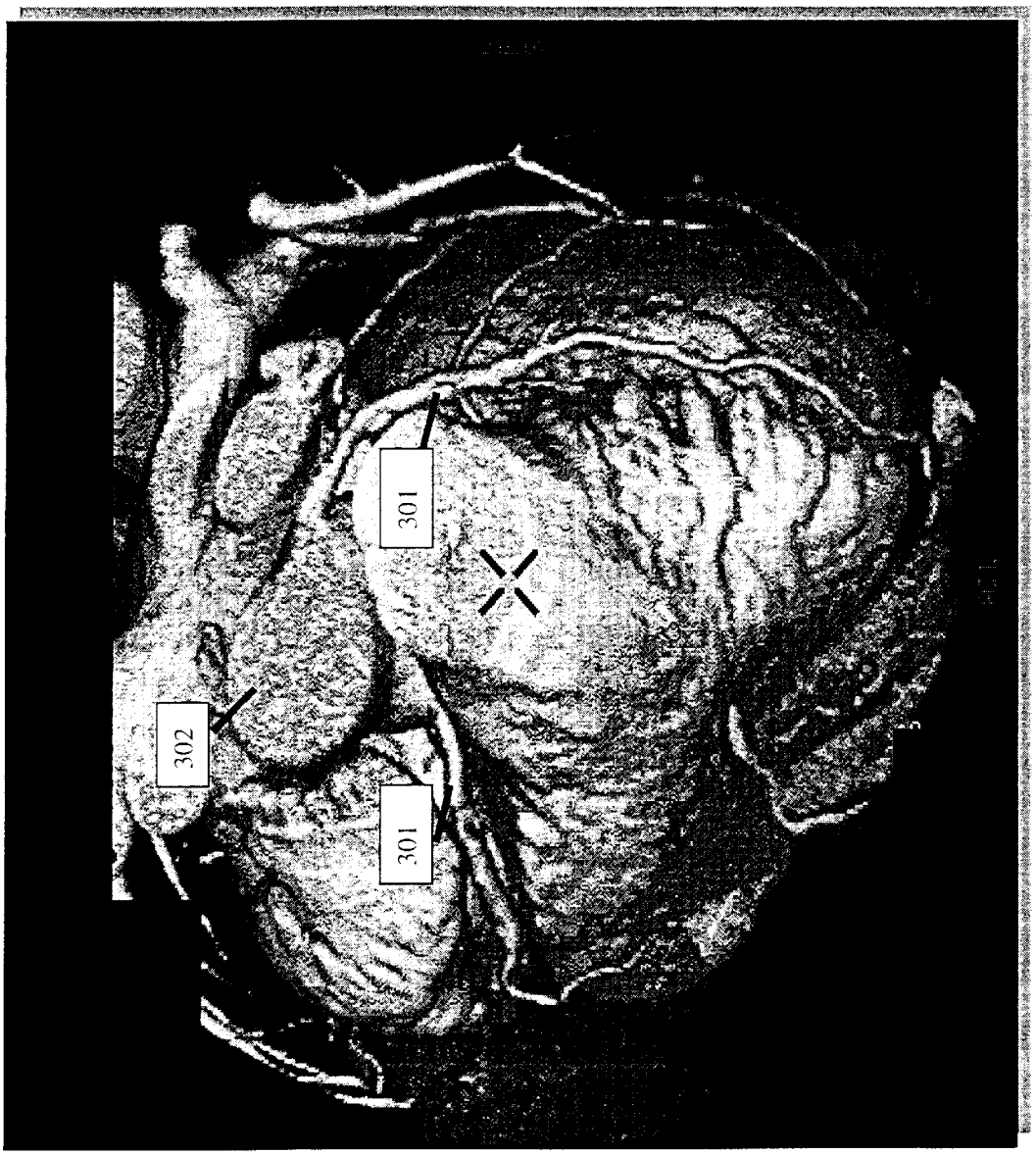
FIG. 5 is an illustration of volumetric input data to which preferred embodiments of the present invention are applicable; and, FIG. 6 is an illustration of a resultant image of a coronary vessel tree after employing the methods shown in FIGS. 1 and 2.
Figure 6:
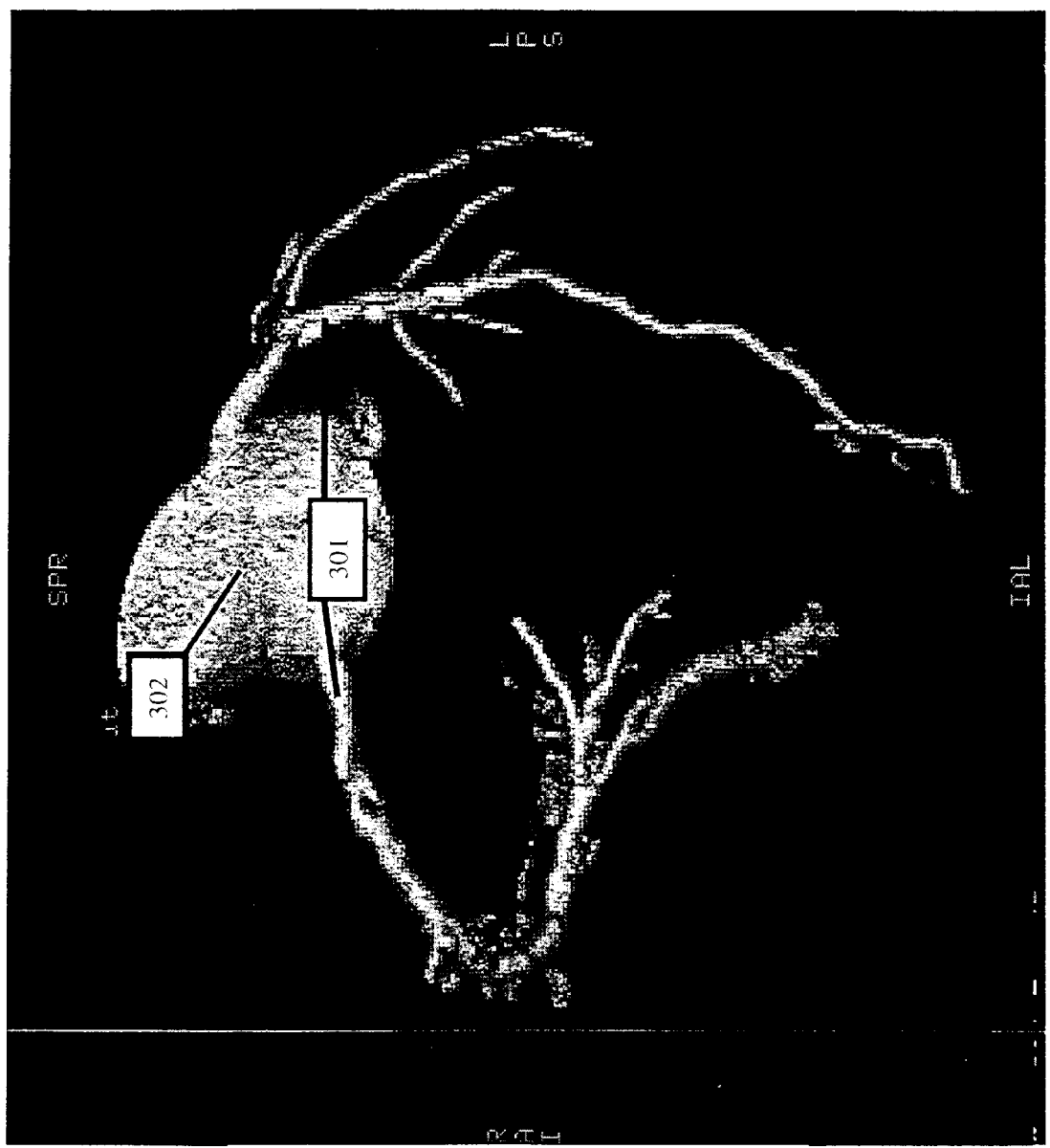

FIGS. 5 and 6 illustrate the effects of the embodiments of the present invention. Referring to FIG. 5, there is shown a volumetric image of a heart including an ascending aorta 302 and coronary vessels 301. After using the methods discussed with reference to FIGS. 1 and 2, FIG. 6 illustrates a resultant image of an extracted coronary vessel tree that is obtained with reduced operator interaction which can be used for medical diagnosis.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. An method for automatically extracting a three-dimensional sub-structure from a plurality of slice images, said method comprising:

depositing a seed point within a selected region of interest on at least one of said slice images; and, segmenting said plurality of slice images responsive to said deposited seed point and in accordance with a plurality of predetermined classification values to extract said three-dimensional sub-structure, wherein said-sub-structure comprises a coronary vessel tree.

2. The method of claim 1 wherein said plurality of slice images are acquired from computed tomography (CT) imaging.

3. The method of claim 1 wherein said plurality of slice images are acquired from magnetic resonance imaging (MRI).

4. The method of claim 1 further comprising displaying said automatically extracted sub-structure using three-dimensional volume rendering techniques.

5. The method of claim 1 further comprising displaying said automatically extracted sub-structure using that is cross-referenced with axial and reformatted images.

6. The method of claim 1 further comprising repeating said segmentation for a plurality of image data sets which contain respective pluralities of images from multiple phases of the heart and further displaying respective extracted coronary sub-structures as animated over time.

7. A method for automatically segmenting a plurality of image slices for a sub-structure contained with said plurality of image slices, said segmentation method comprising:

receiving a deposited seed point;

extracting a plurality of desired regions within said sub-structure in accordance with respective predetermined classifications values for said respective desired regions and connected to said deposited seed point, wherein said sub-structure is a coronary vessel tree and, said desired regions an ascending aorta and left and right coronary arteries; and, generating a segmented sub-structure from said plurality of extracted desired regions.

8. The method of claim 7 wherein said predetermined classification values comprise pixel intensity, pixel size and connectivity.

9. The method of claim 7 wherein said plurality of slice images are acquired from computed tomography (CT) imaging.

10. The method of claim 7 wherein said plurality of slice images are acquired from magnetic resonance imaging (MRI).

\* \* \* \* \*